Dec. 11, 1923.
A. I. SANDBO
1,477,450
WHEEL ALIGNMENT INDICATOR
Filed Aug. 26, 1922     2 Sheets-Sheet 1
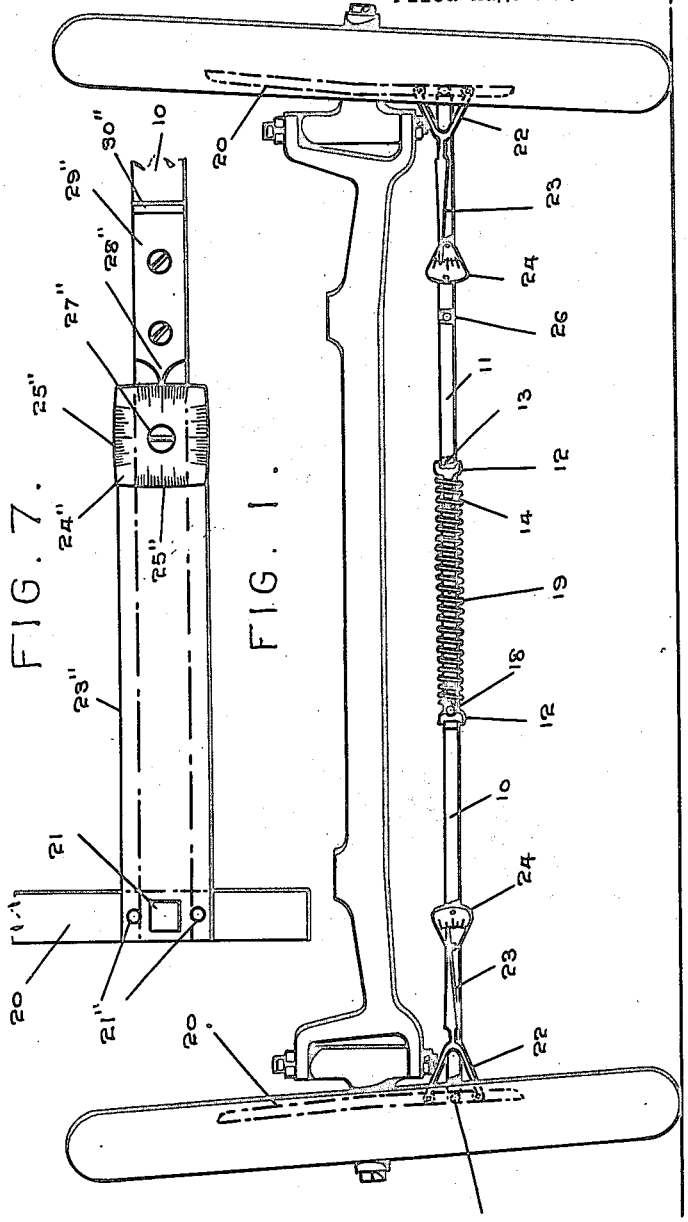
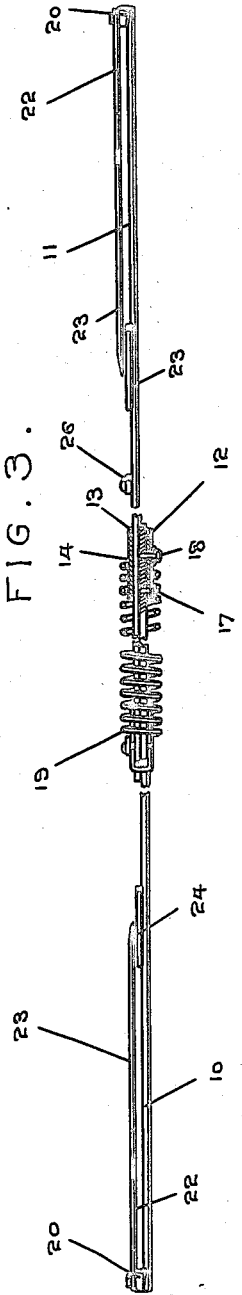
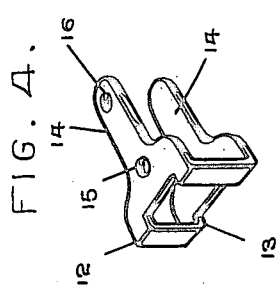
Inventor:
A. I. SANDBO,
By W. J. Fitzgerald & Co.
Attorneys

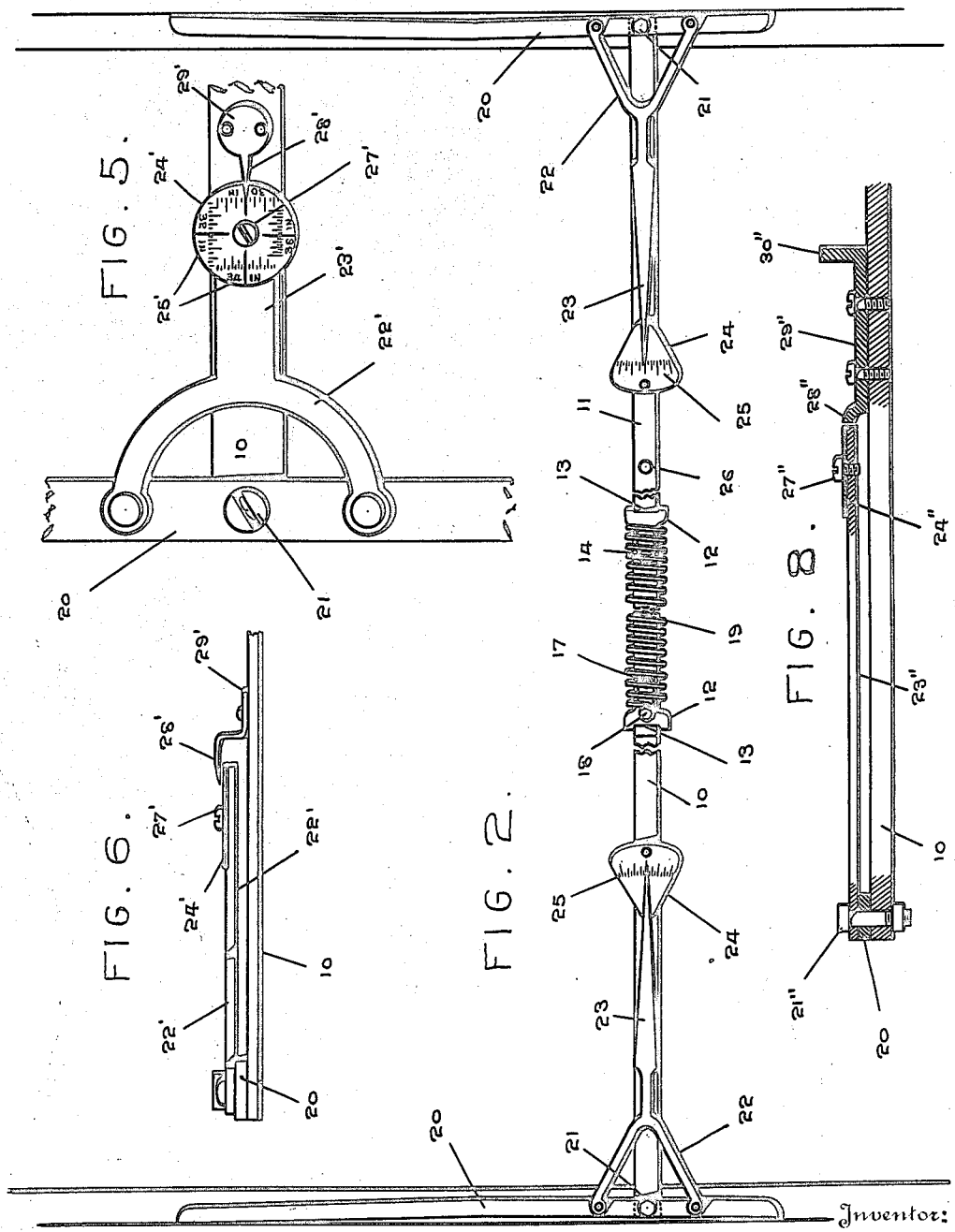

Patented Dec. 11, 1923.

1,477,450

UNITED STATES PATENT OFFICE.

ANTON I. SANDBO, OF ROCK ISLAND, ILLINOIS.

WHEEL ALIGNMENT INDICATOR.

Application filed August 26, 1922. Serial No. 584,481.

*To all whom it may concern:*

Be it known that I, ANTON I. SANDBO, a citizen of the United States, residing at Rock Island, in the county of Rock Island and State of Illinois, have invented certain new and useful Improvements in Wheel Alignment Indicators; and I do hereby declare the following to be a full, clear, and exact description of the invention, such as will enable others skilled in the art to which it appertains to make and use the same.

The present invention relates to a device for application to the wheels of automobiles and other vehicles for indicating the alignment or planes thereof, in order that the wheels can be alined or properly positioned if they are not true, so as to avoid excessive wear on the tires and other parts of the machine, and this application is in part a continuation of the application filed August 19, 1921, Serial No. 493,635.

It is the object of the invention to provide such a wheel position indicator of novel and improved construction, for the convenient, practical and efficient indication of the positions of the wheels.

Another object is the provision of such a device which when applied to the wheels will maintain itself in position and also adjust itself to the wheels when they are being trued or alined.

A further object is the provision of such a device which can be used for indicating the positions of the wheels with respect to both vertical and horizontal lines or planes.

A still further object is the construction of such a device in a simple and inexpensive manner, and with a novel arrangement of the component elements.

The invention has for a further object the provision of means whereby the device can be used for wheels or tires thereof having different diameters.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a front view showing the device between the front wheels of an automobile in a vertical plane to indicate the "pitch" or inclined positions of the wheels with reference to vertical lines or planes.

Fig. 2 is an enlarged plan view of the indicator, portions being broken away, in position between the wheels in a horizontal plane for indicating the "toe-in" positions of the wheels with reference to horizontal lines.

Fig. 3 is an edge elevation of the device, portions being broken away and shown in section.

Fig. 4 is a perspective view of one of the guide clips.

Fig. 5 is a fragmentary plan view showing the use of a multiple graduated plate for readings with different diameters of wheels or tires.

Fig. 6 is an edge view of the parts shown in Fig. 5.

Fig. 7 is a fragmentary plan view similar to Fig. 5 showing another variation.

Fig. 8 is an edge view of the parts shown in Fig. 7.

The general construction of the device is disclosed in the copending application hereinbefore referred to, and the construction includes some alterations and improvements as over the construction disclosed in said application.

The device comprises an extensible member composed of the bars or sections 10 and 11 having their adjacent terminals overlapped and fitted together slidably for the longitudinal adjustment of the member to different lengths. Said bars are slidably connected by means of metal guide clips 12 which are formed of doubled metal blanks, as seen in Fig. 4. The intermediate portions or bends of the clips 12 have openings 13 through which the overlapping portions of the bars extend snugly, and said clip have the tongues 14 overlapping the opposite sides of the bars, and said tongues of the two clips extend toward one another. One tongue of each clip has the apertures 15 and 16, and screws or rivets 17 are engaged through the apertures 16 for fastening the clips to the respective bars adjacent to the inner ends thereof, whereby one clip is secured to each bar and the other bar is slidable through such clip. Screws or rivets 18 are engaged in the other apertures 15 for anchoring the ends of a coiled retractile spring 19 to the clips. Said spring 19 surrounds the overlapping portions of the bars between the clips, and the ends of the spring engage around the anchor members 18 behind the heads thereof. The spring 19 when contracting will move the clips 12 and inner ends of the bars toward one another, thereby moving the outer terminals of the bars away from one another and elongating the extensible member. The tongues 14 are disposed within the end portions of the spring, and said tongues are resilient for pressing the bars together frictionally under tension to provide for a snug motion of the bars when moved toward or away from one another. The spring 19 has a tendency to separate the bars by the contraction of the spring, and the guide clips 12 not only slidably connect the bars but also serve as anchors for the spring.

Blades or bars 20 are pivoted, as at 21, to the opposite ends of the bars 10 and 11, and said blades are of angular form, as seen in Figs. 1 and 2, having a large obtuse angle, so that only the end portions of the blades contact with the inner sides of the wheels. The pivots 21 are located near the corresponding ends of the blades 20, in order that the extensible member can be located nearer to the observer when the device is applied between the wheels, and for the additional purpose of obtaining a more accurate indication than if the pivots were at the centers of the blades. Thus, the extensible member is offset laterally in one direction from the center line bisecting both blades to position said member close adjacent to the corresponding ends of the blades.

In order to indicate the angles between the blades 20 and the extensible member, arched or bifurcated members 22 are riveted or otherwise secured at their ends to the blades 20 at the opposite sides of and spaced from the pivots 21, and said members 22 have the arms or pointers 23 projecting therefrom toward the center of the device over the scale plates 24 riveted or otherwise secured on the bars 10 and 11. The plates 24 have graduations 25 on which the pointers 23 indicate the angles of the blades 20 with reference to the bars 10, and the scales can be suitably graduated for the purpose.

In using the device, supposing that it is desired to set a pair of wheels for longitudinal alignment with reference to horizontal longitudinal lines, such as for testing the front wheels of an automobile for what is called the "toe-in", then the device is applied to the wheels as shown in Fig. 2. The extensible member is contracted by forcing the bars 10 and 11 together, thereby stretching the spring 19, and the device is then readily placed between the wheels and by letting the bars 10 and 11 separate and by properly positioning the device, the blades or bars 20 are brought against the inner sides of the wheels. The blades 20 are positioned to bear at their ends against the fellies or other suitable surfaces of the wheels at the inner sides of said wheels, with the blades 20 in a horizontal plane. The device is preferably applied to the wheels below the axle, and on account of the extensible member being offset from the centers of the blades 20, it can be located forwardly or to one side of the front axle to be nearer the observer for the convenient reading of the indications. The blades 20 will thus assume the same angular positions as the wheels with reference to the horizontal lines, and the "toe-in" angles of the wheels are indicated on the graduations 25 by the pointers 23. If the wheels are not in the proper "toe-in" positions, adjustments can be made while the device is in position, inasmuch as the extensible member is yieldingly extended and will adjust itself lengthwise as the wheels are adjusted, the blades 20 also adjusting themselves with the wheels. The device therefore maintains itself in position during the adjustment of the wheels. It is the usual practice for the front wheels of automobiles to be set at a "toe-in" position, with the front portions of the wheels slightly closer together than the rear portions thereof, commonly called the "toe-in", and by using the present instrument the wheels can be conveniently and quickly adjusted to the proper "toe-in" positions.

By placing the device between the wheels in a vertical plane, as shown in Fig. 1, tests can be made for determining whether or not the wheels are in the proper "pitch" positions with reference to vertical lines. It is usual for the front wheels of an automobile to be inclined so as to diverge upwardly, known as "pitch" of the front wheels, and the inclined angles of the wheels are indicated on the graduations 25 by the pointers 23, enabling the wheels to be properly adjusted if not in proper pitch positions. When the device is used in this position, the offsetting of the bars 10 and 11 will enable said bars to be located lower down than the axle, as seen in Fig. 1, in order that the indications can be conveniently read and noted.

A stop 26 is carried by the bar 11 for the contact of the end of the bar 10 to limit the movement of the bars toward one another, and to prevent the ends of the bars from striking and damaging the plates 24.

Figs. 5 and 6 illustrate a multiple scale indicator for wheels or tires of different diameters. In this modified construction, the arch or bifurcated member 22' which is secured to the blade 20 at opposite sides of the pivot 21, has an arm 23' on which the scale plate or disk 24' is disposed, said plate or disk being rotatable around a clamping and pivot screw 27' threaded in the arm 23'. The face of the disk or plate 24' has several sets of graduations 25', which are graduated for wheels or tires of different diameters, say diameters of 30, 32, 34 and 36 inches. The pointer 28' is carried by a base 29' secured on the bar 10, and said pointer extends over the disk 24' beyond the end of the arm 23'. By loosening the screw 27' the disk 24' can be turned to bring the scale of graduations into position for the cooperation of the pointer, according to the diameter of the wheels or tires with which the device is used, and the screw when tightened will clamp the disk 24' firmly on the arm 23'. In this device, the scale moves with the arm 23' of the blade 20, and the different scales of graduations can be used for different diameters of wheels or tires. The several scales are graduated to indicate the displacement of the tires or wheel fellies from longitudinal vertical planes in inches and fractions thereof, instead of by degrees, it being the practice for the manufacturers and others to indicate the "toe-in" and "pitch" angles by stating the distances, in inches and fractions thereof, that the tires or wheel fellies are offset from longitudinal or vertical lines. Naturally, by using such mediums of measurement, a scale graduated for a wheel of one diameter would not be true for a wheel of another diameter, so that scales for different diameters of wheels will enable adjustments to be made whereby the device will indicate the "toe-in" and "pitch" positions of the wheels accurately for the different sizes of wheels.

Figs. 7 and 8 illustrate another variation in which the arm 23' engages the pivot 21 of the blade 20 and is secured to said blade at opposite sides of the pivot, as at 22". The scale plate 24" is pivoted and clamped on the arm 23" by the screw 27" and has the graduations 25" along its edges for wheels or tires of different diameters. The edges of said plate 24" are curved, whereby the graduated edge which is in active position is curved about the pivot 21 as a center to move closely adjacent to the pointer or index 28" offset from one end of a bar or plate 29" secured on the bar 10. The bar 29" is provided at its opposite end with a lug or ear 30" bent away from the bar 10 to provide a finger piece which can be grasped by the fingers when contracting the extensible member, to prevent the hand from slipping when forcing the bars 9 and 10 together against the tension of the spring 19.

Having thus described the invention, what is claimed as new is:—

1. A wheel position indicator comprising an extensible member having bars with overlapping slidably connected portions, blades pivoted to the opposite ends of said bars, means between the blades and bars for indicating the angles between said blades and said bars, and a spring extending along said bars and arranged for yieldingly separating the opposite ends of said bars.

2. A wheel position indicator comprising an extensible member having bars with overlapping portions, clips carried by said bars and slidably engaging the other bars, blades pivoted to the bars, means for indicating the angles between said blades and said bars, and a coiled spring between said clips for separating the opposite ends of said bars.

3. A wheel position indicator comprising an extensible member having bars with overlapping portions, blades pivoted to the bars, means for indicating the angles between the blades and bars, a clip carried by each bar and slidably engaging the other bar, and a coiled retractile spring surrounding the overlapping portions of the bars and anchored to said clips.

4. A wheel position indicator comprising an extensible member having bars with overlapping portions, doubled clips having openings at their bends slidably receiving the overlapping portions of the bars, said clips having resilient tongues overlapping the opposite sides of the bars and holding the bars together, one clip being secured to each bar, blades pivoted to the bars, and means for indicating the angles between the blades and bars.

5. A device of the character described comprising bars having overlapping portions, doubled clips having openings at their bends slidably receiving said bars, said clips having tongues overlapping the opposite sides of the bars and holding the bars together, the tongues of the two clips extending toward one another, one clip being secured to each bar, and a coiled spring surrounding the overlapping portions of said bars and said tongues and anchored to said clips.

6. A wheel position indicator comprising an extensible member, blades connected to said member to be positioned at different angles relatively to said member, and means for indicating the angles between said blades and member and having a plurality of graduated scales for wheels or tires of different diameters.

7. A wheel position indicator comprising an extensible member, blades connected to said member to be positioned at different angles with said member, and means for indicating the angles between said blades and member including pointers and rotatably adjustable plates having graduated scales for different diameters of wheels or tires to be brought into cooperation with the pointers.

8. A wheel position indicator comprising an extensible member, blades pivoted to said member, arms secured to the blades, pointers carried by said member and scale plates pivoted on said arms and having graduated scales for different diameters of wheels or tires adapted to be turned to a position for cooperation with said pointers.

In testimony whereof I have signed my name to this specification in the presence of two subscribing witnesses.

ANTON I. SANDBO.

Witnesses:
 THOMAS SIMCOX,
 F. MACHEN, Jr.,